US010720169B2

(12) United States Patent
Reitz et al.

(10) Patent No.: US 10,720,169 B2
(45) Date of Patent: *Jul. 21, 2020

(54) AUDIO WATERMARK AND SYNCHRONIZATION TONES FOR RECORDING DEVICES (71) Applicant: Axon Enterprise, Inc., Scottsdale, AZ (US)

(72) Inventors: James N. Reitz, Bainbridge Island, WA (US); Patrick W. Smith, Scottsdale, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/181,333

(22) Filed: Nov. 5, 2018

(65) Prior Publication Data

US 2019/0139558 A1 May 9, 2019

Related U.S. Application Data (63) Continuation of application No. 15/446,224, filed on Mar. 1, 2017, now Pat. No. 10,121,478.
(Continued)

(51) Int. Cl.
G10L 19/018 (2013.01)
G11B 27/10 (2006.01)
G11B 27/30 (2006.01)

(52) U.S. Cl.
CPC .......... G10L 19/018 (2013.01); G11B 27/10 (2013.01); G11B 27/3009 (2013.01); G11B 27/3045 (2013.01)

(58) Field of Classification Search
CPC ... G10L 19/018; G11B 27/10; G11B 27/3009; G11B 27/3045
See application file for complete search history.

(56) References Cited

U.S. PATENT DOCUMENTS 6,025,874 A 2/2000 Cooper et al.
7,057,663 B1 6/2006 Lee
(Continued)

FOREIGN PATENT DOCUMENTS

EP 1098522 A1 5/2001
RU 2510895 C2 4/2014
WO 2014179810 A1 11/2014

OTHER PUBLICATIONS

International Searching Authority, International Search Report for International Patent Application No. PCT/US2017/020128 dated Jun. 21, 2017.
(Continued)

Primary Examiner — Thai Q Tran
Assistant Examiner — Sunghyoun Park
(74) Attorney, Agent, or Firm — Andrew Graham (57) ABSTRACT A recording device, such as a video camera, emits audio watermarks (e.g., audible tones, inaudible tones) and records audio watermarks emitted by other recording devices. The audio watermarks provide information (e.g., data) such as an identifier of the camera and the identity of the operator. Audio watermarks may further include time information such as a timestamp indicating the time that the audio watermark was emitted by the camera. Audio watermarks may be emitted and recorded at intervals while recording an incident. A processing system, such as a digital video and audio processing system, may receive video information and recorded watermarks from multiple recording devices. The processing system may use the audio watermarks recorded by each recording device to determine which recording devices were in the vicinity of an incident. The processing system may also use the audio watermarks to align (e.g., synchronize) the video recorded by the various recording devices. Alignment of recorded video may permit synchronized playback of the recorded video from the various
(Continued)

recording devices. Alignment may further identify at what point during an incident a recording device began and terminated recording.

20 Claims, 9 Drawing Sheets

Related U.S. Application Data (60) Provisional application No. 62/306,549, filed on Mar. 10, 2016.

(56) References Cited

U.S. PATENT DOCUMENTS

| | | | |
|---|---|---|---|
| 7,216,232 B1 | 5/2007 | Cox et al. | |
| 2002/0076082 A1 | 6/2002 | Arimura et al. | |
| 2002/0080783 A1 | 6/2002 | Fujimori | |
| 2003/0012548 A1* | 1/2003 | Levy | G06F 21/125 386/251 |
| 2003/0039464 A1* | 2/2003 | Davis | G06T 1/0021 386/260 |
| 2003/0044042 A1 | 3/2003 | King | |
| 2003/0123659 A1 | 7/2003 | Forstrom et al. | |
| 2004/0037449 A1* | 2/2004 | Davis | G06F 21/10 382/100 |
| 2006/0277609 A1* | 12/2006 | Brandon | G06F 21/10 726/28 |
| 2007/0276670 A1 | 11/2007 | Pearlstein | |
| 2008/0109113 A1 | 5/2008 | Baack | |
| 2008/0151056 A1 | 6/2008 | Ahamefula | |
| 2009/0150919 A1 | 6/2009 | Lee et al. | |
| 2010/0253780 A1 | 1/2010 | Li | |
| 2011/0016204 A1 | 1/2011 | Wiener | |
| 2012/0063635 A1* | 3/2012 | Matsushita | G06T 1/0028 382/100 |
| 2014/0108020 A1* | 4/2014 | Sharma | G10L 19/018 704/500 |
| 2014/0192208 A1 | 7/2014 | Okincha | |
| 2014/0245339 A1* | 8/2014 | Zhang | H04N 21/8358 725/18 |
| 2014/0253326 A1 | 9/2014 | Cho | |
| 2015/0016661 A1* | 1/2015 | Lord | H04N 21/42203 382/100 |
| 2015/0222951 A1 | 8/2015 | Ramaswamy | |
| 2015/0237252 A1 | 8/2015 | O'Donnell et al. | |
| 2015/0261491 A1 | 9/2015 | Hayano | |
| 2016/0196852 A1 | 7/2016 | Sievert | |

OTHER PUBLICATIONS

European Patent Office, Extended European Search Report for European Patent Application No. 17763757.6 dated Sep. 12, 2019.
Suzuki, Sakamoto, Igarashi, AnnoTone: Record-time Audio Watermarking for Context-aware Video Editing, CHI 2015, Crossing, Seoul, Korea.

* cited by examiner

AUDIO WATERMARK AND SYNCHRONIZATION TONES FOR RECORDING DEVICES

BACKGROUND

With the ubiquity of digital video cameras in everyday life, it is common for events and incidents to be recorded by multiple observers using multiple cameras. For example, in a law enforcement scenario, an incident may be recorded by an officer's vehicle-mounted camera, an officer's body camera, a smart phone camera operated by a witness to the incident, or other cameras worn or used by other officers at the incident. The video captured by all of these cameras may be relevant during an investigation of the incident. However, there is currently no easy or reliable way to identify the cameras that may have been used to record the incident, or to synchronize the video recorded by the various cameras.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In the following description, numerous specific details are set forth in order to provide a thorough understanding of illustrative embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein. The illustrative examples provided herein are not intended to be exhaustive or to limit the claimed subject matter to the precise forms disclosed.

The technological solutions described herein provide technological benefits relating to, for example, processing and handling of digital media content (e.g., digital video, digital audio) within computer systems. It will be understood that although illustrative systems and processes are described herein in terms of "evidence," "law enforcement," and the like in order to describe illustrative usage scenarios, the disclosed subject matter is not inherently legal in nature or limited to organization of human activities.

In described embodiments, recording devices emit audio watermarks that identify the recording devices, and that may be recorded by other nearby devices. In illustrative embodiments described herein, the identified recording devices are video recording devices (e.g., a wearable camera, a handheld camera, a dashboard camera, a smart phone with video recording capability) that have recorded video of an event or scene. Audio watermarks include tones that represent a recording device identifier (e.g., a serial number). Audio watermarks also may include tones that represent a timestamp (e.g., date, time), a user identifier (e.g., an identifier for a law enforcement officer associated with the recording device), location information (e.g., for GPS-equipped cameras) and/or other information. Audio watermarks may be useful, for example, in a law enforcement scenario to identify video cameras that may have recorded events that are relevant to an incident being investigated by a law enforcement agency. A suitably configured camera can emit audio watermarks multiple times during a single recording session (e.g., every 30 seconds, 1 minute, 2 minutes, or some other interval) to help ensure that other recording devices in the area will have the opportunity to record the audio watermarks.

Recorded audio watermarks can be provided, along with video data and other audio data, to a digital video and audio processing system configured to process the audio watermarks to identify devices that recorded video of the event. The audio data also may include video synchronization tones. Synchronization tones may be useful, for example, in a law enforcement scenario to help synchronize video of the same event that has been recorded by multiple cameras that begin recording at different times. Accordingly, the digital video and audio processing system also may include a synchronization engine configured to use the synchronization tones to synchronize video of an event. For example, a suitably configured camera can emit synchronization tones at regular intervals (e.g., every 30 seconds, 1 minute, 2 minutes, or some other interval) to facilitate video synchronization. The synchronization tones may be similar to audio watermarks in that they may identify the devices that emit them. In some embodiments, synchronization tones may be emitted separately or may be included with audio watermarks as additional information emitted at regular intervals. Or, information already present in audio watermarks (e.g., device identifier, timestamp) may also be used for video synchronization.

Figure 1:
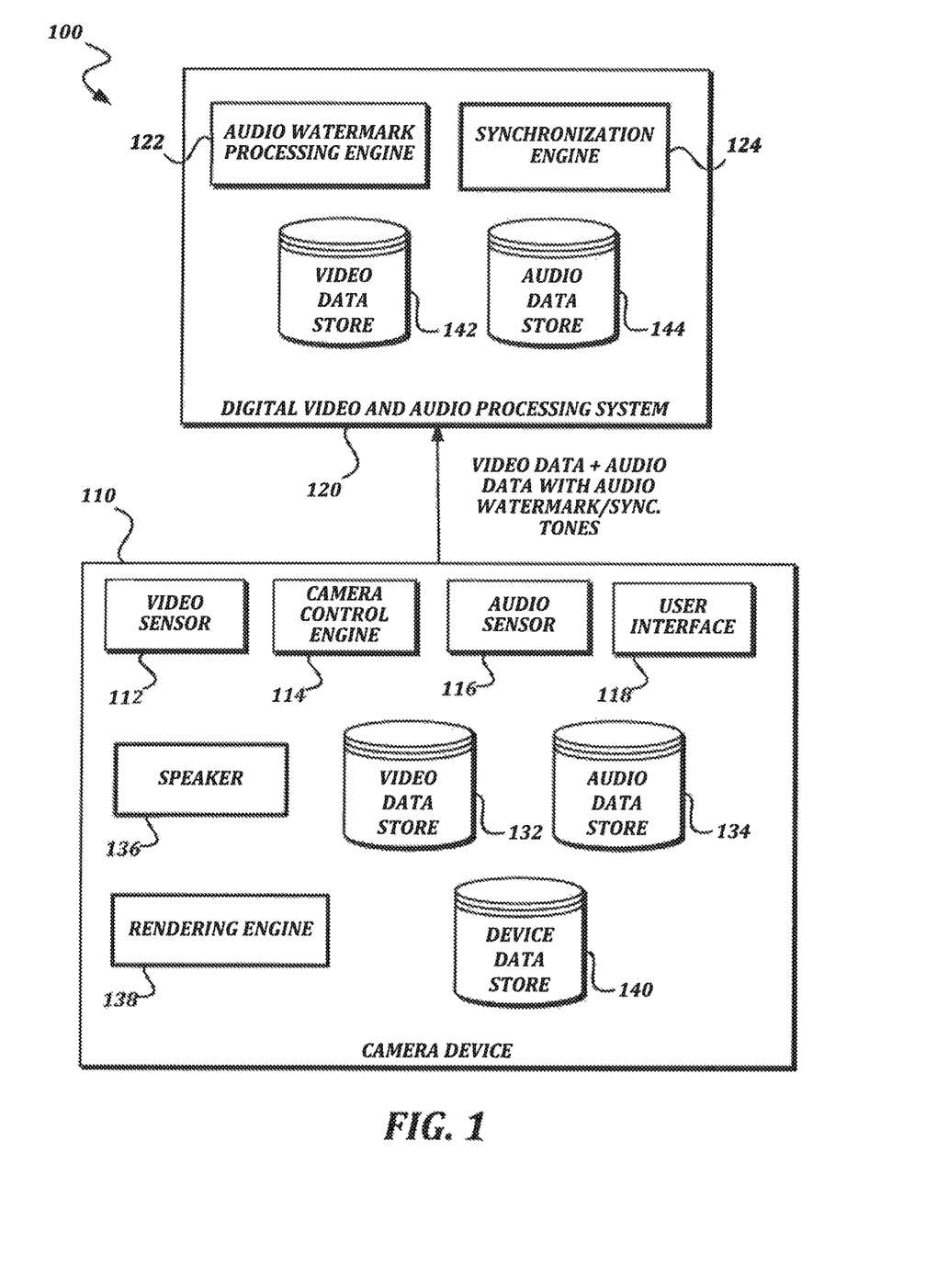
FIG. 1 is a schematic diagram that illustrates communication between various components of an exemplary embodiment of a system that processes video information and audio information including audio watermarks, according to various aspects of the present disclosure.

FIG. 1 is a high-level schematic diagram that illustrates communication between various components of an illustrative embodiment of a system 100 according to various aspects of the present disclosure. In the example shown in FIG. 1, a digital video and audio processing system 120 includes a video data store 142, an audio data store 144, and an audio watermark processing engine 122 configured to process the audio watermarks to identify devices that recorded video of the event. The digital video and audio processing system 120 also may include a synchronization engine 124 configured to use synchronization tones to synchronize video of an event. The digital video and audio processing system 120 communicates with a camera device 110. Although only one camera device is shown for ease of illustration, any number of camera devices or other media devices may communicate with the system 120. The digital video and audio processing system 120 may receive audio and video data directly from the camera device(s) or indirectly via other components or devices.

In the example shown in FIG. 1, the camera device 110 includes a video sensor 112 and an audio sensor 116. Devices configured to emit audio watermarks or synchronization tones also will include an audio output device, such as a speaker 136, and may include a rendering engine 138 configured to render audio watermarks and/or synchronization tones for output by the speaker 136. Audio watermarks may include device identifiers, timestamps, or the like, as described in further detail below. Device identifiers (e.g., serial numbers) and/or other information included in the audio watermarks or synchronization tones may be obtained from a device data store 140, or from some other source.

Any type of microphone may be used as an audio sensor 116. However, described in further detail below, the audio sensor 116 may be configured to accurately record audio watermarks and synchronization tones. One example of an appropriate video sensor is a charge-coupled device (CCD), though any other digital image sensor, such as a complementary metal-oxide-semiconductor (CMOS) sensor, an active pixel sensor, or any other type of digital image sensor could be used instead.

Data collected by the video sensor 112 and the audio sensor 116 may be stored in a video data store 132 and an audio data store 134, respectively, though in some embodiments the audio and video information may be stored together in a single data store and/or in a combined data file. Typically, the video and audio data will be compressed in some way by a video encoder (e.g., an encoder that encodes in an MPEG-2/H.262, H.263, VC-1, H.264/MPEG-4 AVC, or HEVC (H.265/MPEG-H) format) and an audio encoder (e.g., an audio encoder that encodes in an MP3, Vorbis, AAC, HE-AAC, or Windows Media Audio (WMA) format) in order to reduce demand on computing resources. The compressed data can then be decompressed by a corresponding decoder prior to playback and/or further processing. As described in further detail below, audio data compression techniques can be chosen to avoid distortion of audio watermarks and synchronization tones.

In the example shown in FIG. 1, the camera device 110 also includes a camera control engine 114. The camera control engine 114 is configured to change settings of the camera device 110 and cause the camera device 110 to perform camera functions. For example, the camera control engine 114 may cause the video sensor 112 and audio sensor 116 to begin obtaining data, and may cause the video and/or audio data to be saved in the video data store 132 and/or audio data store 134 after receiving it from the respective sensor(s). The camera control engine 114 may receive commands to start, pause, or stop video or audio recording from user input via a user interface (e.g., hardware buttons, touchscreen) of the camera device 110, or may automatically start, pause, or stop the video recording in response to an instruction received from, for example, a notification processing engine, as described in further detail below with reference to FIG. 7. In response to such user input or instructions, the camera control engine 114 may also change settings on the video sensor 112 and/or audio sensor 116, such as image quality, white balance, recording levels, and/or any other video or audio recording setting. Starting video recording may include transitioning from a pre-trigger mode, wherein video data and/or audio data is saved in a pre-trigger buffer such as a ring buffer, to a post-trigger mode wherein video data and/or audio data is saved in the video data store 132 and/or the audio data store 134. Likewise, stopping video recording may include transitioning from the post-trigger mode to the pre-trigger mode.

Figure 2A:
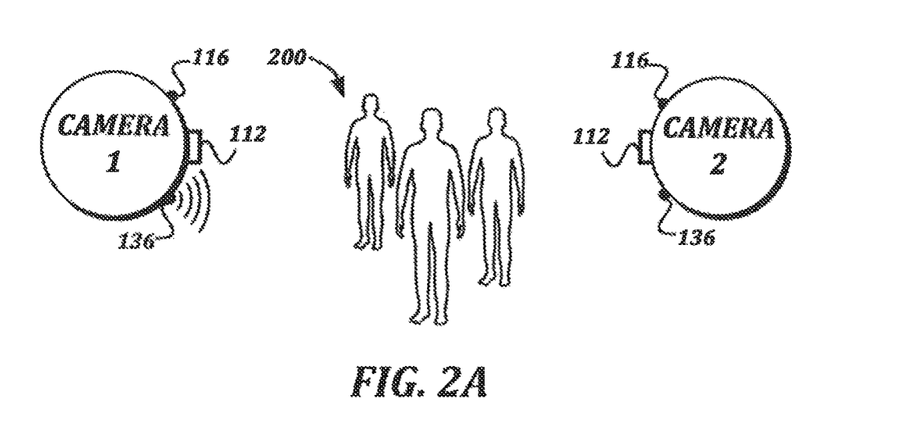
FIGS. 2A and 2B are diagrams of an illustrative usage scenario in which multiple camera devices record video of a scene and emit audio watermarks, according to various aspects of the present disclosure.
Figure 2B:
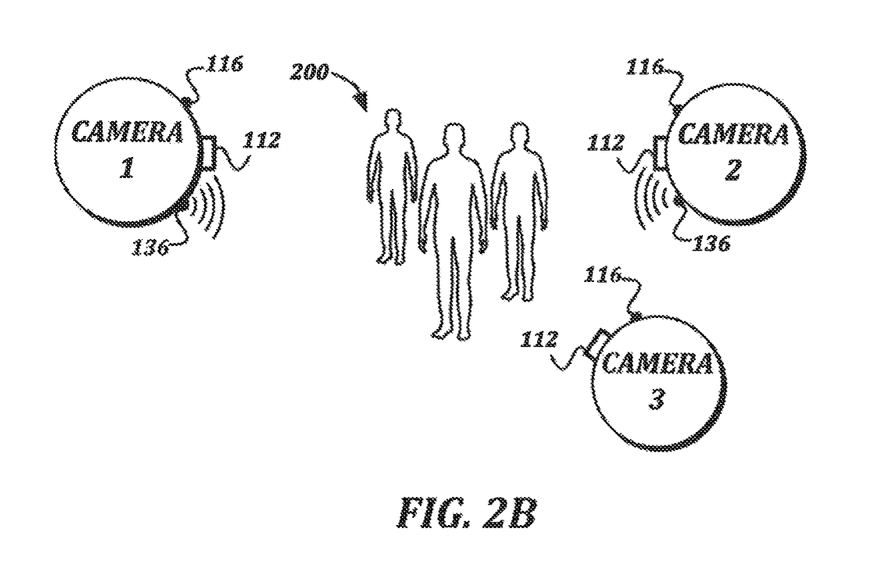

FIGS. 2A and 2B are high-level schematic diagrams of an illustrative usage scenario in which multiple camera devices record video of a scene and emit audio watermarks, according to various aspects of the present disclosure. In the illustrative scenario depicted in FIGS. 2A and 2B, Cameras 1 and 2 are present at a scene 200. Cameras 1 and 2 each include a video sensor 112, an audio sensor 116, and a speaker 136. In FIG. 2A, Camera 1 (e.g., a wearable camera device worn by a law enforcement officer) begins recording video of the scene 200 and emits an audio watermark that is recorded by the audio sensors 116. In FIG. 2B, Camera 3 (e.g., a smartphone camera operated by a bystander) arrives at the scene and also begins recording video of the scene 200. Camera 2 (e.g., a wearable camera device worn by another law enforcement officer) also begins recording video of the scene 200 and also emits an audio watermark. In this example, Cameras 1 and 2 emit their respective audio watermarks at regular intervals (e.g., every 30 seconds, 1 minute, 2 minutes, or some other interval). Thus, as new cameras arrive on the scene (e.g., Camera 3), the watermarks will be recorded even if the new cameras were not present when the watermarks for emitted for the first time.

In the scenario depicted in FIGS. 2A and 2B, audio and video of the scene 200 is recorded by three different devices. Although Camera 3 is not configured to emit audio watermarks, it includes an audio sensor 116 that can record the audio watermarks emitted by Cameras 1 and 2. Thus, in this example, the recording of Cameras 1 and 2 can be confirmed independently by analyzing audio watermarks in the audio data provided by any of the three cameras. Further, the presence of Camera 3 at the scene can also be confirmed by analyzing the audio data recorded by Camera 3, and detecting the audio watermarks of Cameras 1 and 2 within the audio data.

Figure 3:
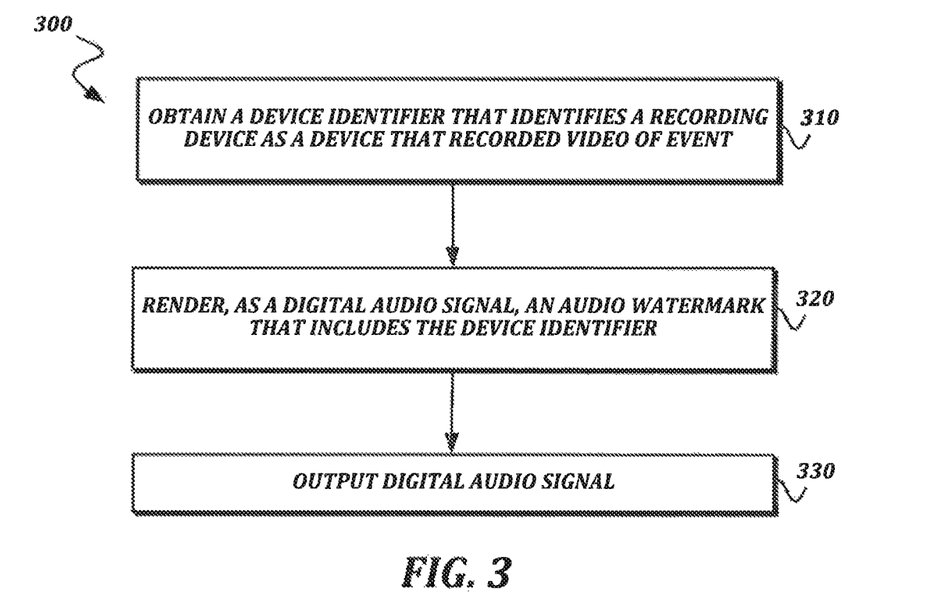
FIG. 3 is a flow chart of an illustrative process for rendering an audio watermark according to various aspects of the present disclosure.

FIG. 3 is a flow chart of an illustrative process 300 for rendering an audio watermark according to various aspects of the present disclosure. The process 300 can be performed by the camera device 110 depicted in FIG. 1, or by some other device or combination of devices. At step 310, the device obtains a device identifier that identifies a recording device as a device that recorded the event. At step 320, the device renders, as a digital audio signal, an audio watermark that includes the device identifier. At step 330, the device outputs the rendered digital audio signal, e.g., via a speaker on the device. For example, the camera device 110 may obtain its own device identifier from device storage and render an audio watermark that includes the device identifier. The audio signal can then be output when the camera device begins recording. Alternatively, the device identifier may be obtained and the audio watermark may be rendered by some other computing device and pre-loaded onto the camera device, thereby avoiding the need for the camera device to render the audio signal on its own. The pre-loaded audio signal can then be output when the camera device begins recording.

Figure 4:
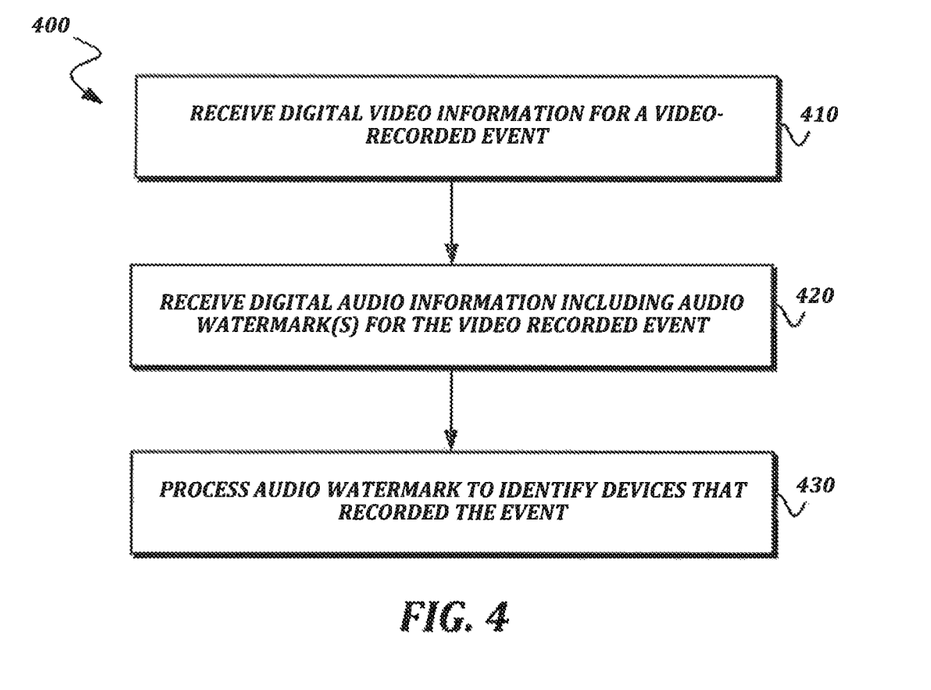
FIG. 4 is a flow chart of an illustrative process for processing audio watermarks according to various aspects of the present disclosure.

FIG. 4 is a flow chart of an illustrative process 400 for processing audio watermarks according to various aspects of the present disclosure. The process 400 can be performed by the digital video and audio processing system 120 depicted in FIG. 1, or by some other device or combination of devices. At step 410, the digital video and audio processing system receives digital video information for a video-recorded event. At step 420, the digital video and audio processing system receives digital audio information that includes one or more audio watermarks for the video recorded event. At step 430, the digital video and audio processing system processes the audio watermarks to identify devices that recorded the event.

Design Considerations for Audio Watermarks

Audio watermarks can be designed in many different ways. In general, however, it is preferred that audio watermarks may be easily and accurately recorded by microphones nearby (e.g., at volumes and within frequency ranges that nearby microphones can detect). Depending on the specifics of a particular design, this arrangement may involve general purpose microphones (e.g., microphones that may typically be provided on a smartphone or handheld video camera), special-purpose microphones, or some combination. As an example, for audio watermarks that are emitted at frequencies at the upper end of or above a typical human hearing range, a special-purpose microphone may include a band-pass filter configured to filter out lower-frequency sound and focus on the expected frequency band of the audio watermarks. Combinations of general-purpose and special-purpose microphones may be provided together in a specially configured device with both general-purpose and special-purpose microphones, or may be distributed among a combination of devices.

It may be beneficial for audio watermarks be emitted in such a way that they are not easily heard, or at least not distracting to humans nearby (e.g., to avoid disrupting an investigation of an incident). Thus, depending on factors such as the design of the system or the particular acoustic environments in which the system is used, it may be beneficial to emit audio watermarks in frequency ranges that are inaudible or nearly inaudible (e.g., above 20 kHz), for human listeners.

However, audio watermarks are not required to be undetectable by human listeners. In many cases, the ability of nearby microphones to accurately record an audio watermark may be more important than secrecy. Therefore, other factors besides detectability can be considered, such as the technical characteristics (e.g., frequency range) of the microphones that are expected to be used. For example, if available microphones are expected to be able to only record frequencies below 15 kHz, audio watermarks can be emitted at a frequency below 15 kHz. On the other hand, if high-quality microphones with a wide frequency range are used, audio watermarks can be emitted at higher audible frequencies, and potentially even ultrasonic frequencies (e.g., above 20 kHz).

Similarly, the effects of any audio data processing to be used may also be considered in the design of the audio watermarks. If a device is configured to process recorded audio information in a way that distorts or removes inaudible frequencies, or frequencies that are less perceptually important to human listeners (as is common in some audio compression techniques), a high-frequency audio watermark may be scrambled or lost. However, strategies can be employed to avoid this situation. For example, a different frequency range that is less prone to distortion can be used, or a different audio processing technique that preserves the integrity of the audio watermark can be used. If low bitrate lossy audio compression distorts audio watermarks or synchronization tones, a higher-bitrate setting or a different audio encoder, such a lossless audio encoder, can be used to avoid such distortion.

Examples

In this section, illustrative designs for an audio watermark are described. As will be understood from the description above and below, other designs are possible within the scope of the present disclosure.

In the examples described in this section, the illustrative audio watermarks include tones that represent a recording device identifier (e.g., a serial number). Audio watermarks also may include tones that represent a timestamp (e.g., date, time), a user identifier (e.g., an identifier for a law enforcement officer associated with the recording device), location information (e.g., for GPS-equipped cameras) and/or other information.

An audio signal can represent such information in different ways. In the examples described in this section, audio watermarks include tones that represent the recording device identifier as a string of bits (1s and 0s), with is represented by a tone at a first frequency (f1), and 0s represented by a tone at a second frequency (f2). Timestamps and other information can be transmitted in similar ways. To avoid conflicts between audio watermarks emitted by different devices at the same time, different devices can emit audio watermarks at different frequencies.

In the examples described in this section, the duration of a tone also has significance. A tone at frequency f2 lasting 1 unit of time (e.g., 1 ms) may be interpreted as 0, while a tone at the same frequency lasting 4 units of time is interpreted as 0000. Thus, 1000 bits (or 125 bytes) can be transmitted in one second using a 1 ms unit of time, 2000 bits (or 250 bytes) can be transmitted in one second using a 0.5 ms unit of time.

Any suitable unit of time may be used. However, it is preferable that the duration of the unit of time be compatible with the devices that are expected to record the tones. For example, if the audio sampling rate of a device expected to record the audio watermark is 32 kHz (a period of 0.03125 ms), a signal with a unit of time less than 0.03125 ms may not be accurately recorded.

Together, strings of bits can represent integers, characters, or symbols (e.g., in an ASCII or UTF-8 format) that make up the recording device identifier or other information in the audio watermark. For example, the device identifier 45 can be transmitted with tones representing the bit string 0110100 (4 in ASCII format) followed by tones representing the bit string 0110101 (5 in ASCII format). Various strategies can be employed to reduce the number of bits to be transmitted.

If it is known that only the integers 0-9 will be included in the audio watermark (or in some portion of the watermark), the 011 prefix can be omitted from each string in the watermark (or portion thereof), with integers simply being represented by their binary equivalent (e.g., 0010=2, 0011=3)

The payload of an audio watermark can be framed by special codes. Such codes can provide an easy way for a decoder to distinguish the audio watermark from background noise or other audio signals.

In the examples described in this section, the payload of the audio watermark is preceded by a start code and followed by an end code. The start code and end code indicate the beginning and end, respectively, of the audio watermark, while also taking care to avoid emulating payload data. For example, a start code of 11111111 and an end code of 11111110 could be used to indicate the beginning of an audio watermark, with the payload being designed such that no strings of seven or more consecutive is are permitted. An audio watermark consisting of the device identifier 2345 can transmitted as 11111111 0010 0011 0100 0101 11111110 including a start code and an end code. Other lengths and configurations of start codes and end codes also can be used.

In the examples described in this section, the nature of the information in the audio watermark can be determined from its expected length and its position. For example, an audio watermark signal containing a device identifier and a timestamp can take the form of:

[start code] [device ID] [timestamp] [end code], where [start code] is 2 bytes, [device ID] is 4 bytes, [timestamp] is 8 bytes, and [end code] is 2 bytes. Alternatively, the information can be signaled in some other way.

Illustrative Use in Distributed Control System

In this section, an illustrative use of audio watermarks in a distributed control system is described. For more information on distributed control systems and related methods, see U.S. patent application Ser. No. 14/918,392, entitled "Systems and Methods for Distributed Control," filed on Oct. 20, 2015, which is incorporated herein by reference.

Figure 5:
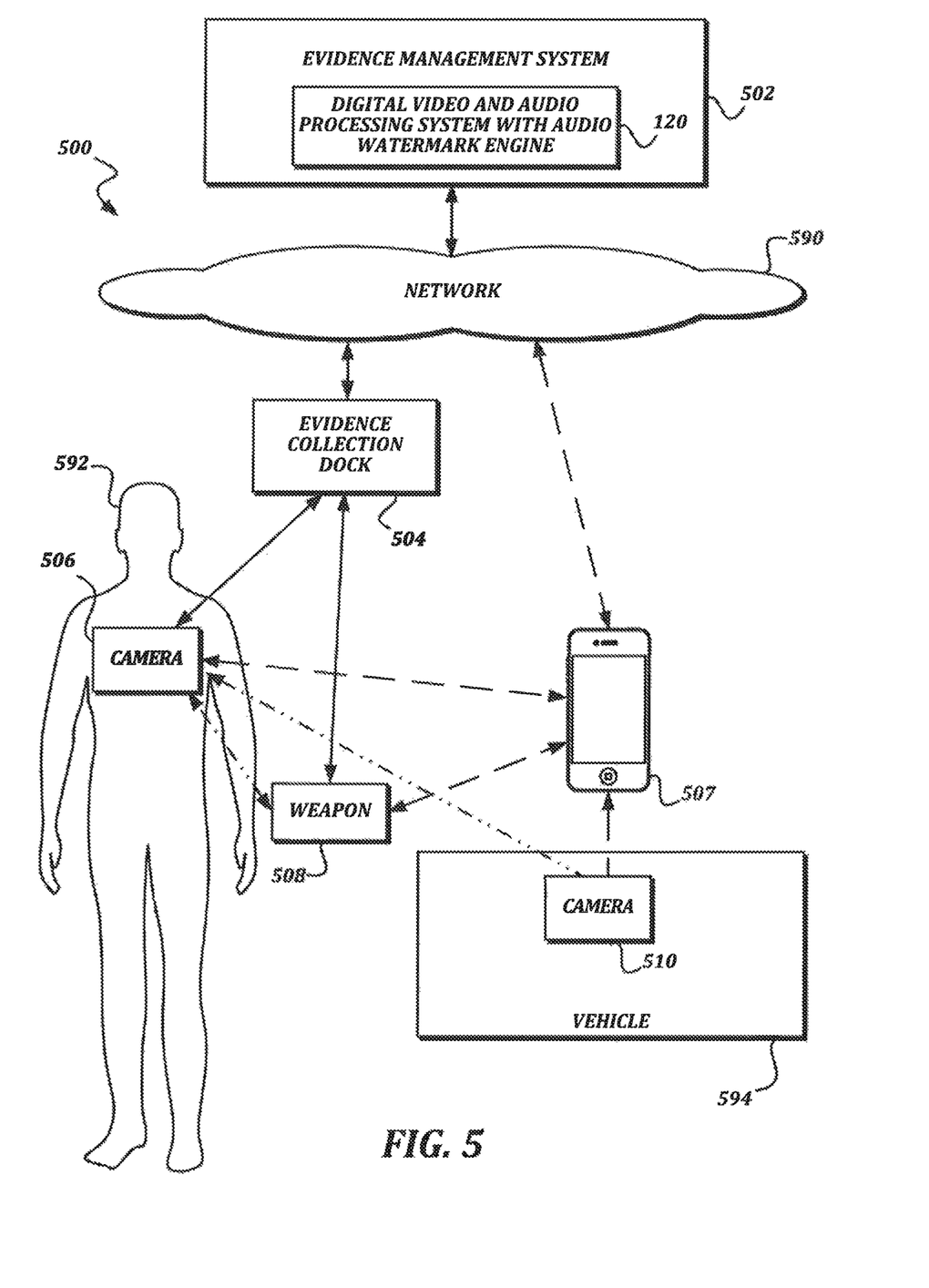
FIG. 5 is a high-level schematic diagram that illustrates communication between various components of an exemplary embodiment of a distributed control system according to various aspects of the present disclosure.

FIG. 5 is a high-level schematic diagram that illustrates communication between various components of an exemplary embodiment of a distributed control system according to various aspects of the present disclosure. The system 500 is configured to allow for distributed control of various devices within the system 500.

In this example, a user 592, such as a law enforcement officer, may be associated with one or more devices. The devices may include, but are not limited to, a wearable camera 506, a weapon 508, and various devices associated with a vehicle 594, such as a vehicle-mounted camera 510. The weapon 508 may be, for example, a conducted energy weapon (CEW) that transmits notifications regarding events such as firing events, cartridge loading, holster removal, and/or the like. Other devices, such as a heart rate sensor device, a holster sensor device, and/or the like may also be included in the system 500 but are not illustrated in FIG. 5.

The system includes an evidence management system 502 having a digital video and audio processing system with an audio watermark processing engine, such as the digital video and audio processing system 120 shown in FIG. 1. The digital video and audio processing system 120 is configured to receive and process audio watermarks as described in detail above, and may also include a synchronization engine. Audio watermarks and synchronization tones may be provided by devices shown in FIG. 5 (such as the wearable camera 506 or the vehicle mounted camera 510). The digital video and audio processing system 120 also may receive and process audio watermarks and synchronization tones from other devices, such as a bystander's smartphone or handheld video camera (not shown), either via the network 590 shown in FIG. 5 or in some other way.

Some of the devices in the system 500 may have limited communication functionality. For example, devices may have short-range wireless communication abilities, but some devices may only be able to perform a direct long-range transmission or reception of information, such as to an evidence management system 502, when physically connected to an evidence collection dock 504 that communicates with the evidence management system 502 via a network 590 such as a LAN, a WAN, and/or the Internet.

In some embodiments, a personal assistant computing device 507 is provided. The personal assistant computing device 507 may be a smartphone computing device as shown in FIG. 5, a laptop computing device, a tablet computing device, or any other suitable computing device capable of performing actions described herein. The personal assistant computing device 507 may be capable of short-range communication with the devices in the system 500, and may also be capable of long range communication with the evidence management system 502, a dispatch system, or any other system. In some embodiments, the personal assistant computing device 507 has the components and capabilities of a peripheral device 800 and/or a controllable device 600 as discussed below with reference to FIGS. 6 and 8. Further aspects of these devices and their capabilities will be discussed below.

Figure 6:
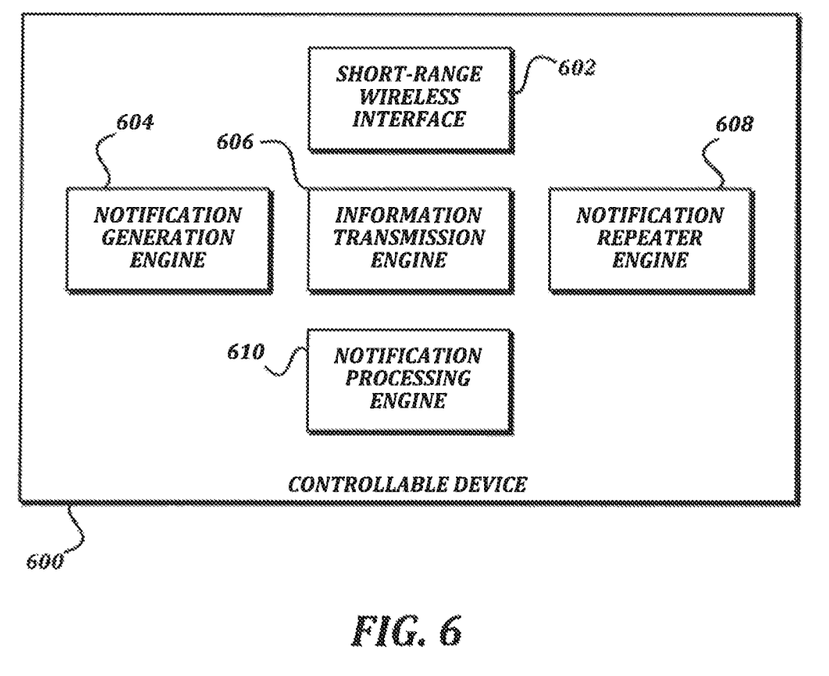
FIG. 6 is a block diagram that illustrates an exemplary embodiment of a controllable device that may be used in a distributed control system according to various aspects of the present disclosure.

FIG. 6 is a block diagram that illustrates an embodiment of a controllable device according to various aspects of the present disclosure. As illustrated, the controllable device 600 includes a short-range wireless interface 602. The short-range wireless interface 602 may be configured to use any suitable wireless networking technology capable of wirelessly exchanging data with other devices within range of the controllable device 600, including but not limited to Bluetooth (including Bluetooth Low Energy), ZigBee, NFC, and/or the like.

As illustrated, the controllable device 600 also includes a notification generation engine 604, an information transmission engine 606, a notification repeater engine 608, and a notification processing engine 610. In general, the term "engine" as used herein refers to logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C #, and/or the like. An engine may be compiled into executable programs or written in interpreted programming languages. Engines may be callable from other engines or from themselves. Generally, the engines described herein refer to modules that can be merged with other engines to form a single engine, or can be divided into multiple sub-engines. The engines may be embodied in any type of circuit such as an FPGA or an ASIC; and/or may be stored in any type of computer-readable medium or computer storage device and be stored on and executed by one or more general purpose computers, thus creating a special purpose computer configured to provide the engine. Accordingly, the devices and systems illustrated herein include one or more computing devices configured to provide the illustrated engines, though the computing devices themselves have not been illustrated in every case for the sake of clarity.

In some embodiments, the notification generation engine 604 is configured to create and transmit new notifications based on information obtained by components of the controllable device 600. In some embodiments, the information transmission engine 606 is configured to respond to requests for information associated with notifications after notifications have been transmitted by the notification generation engine 604 and received by other devices. In some embodiments, the notification repeater engine 608 is configured to create and transmit notifications based on notifications received by the controllable device 600 from other devices. In some embodiments, the notification processing engine 610 is configured to analyze notifications received from other devices via the short-range wireless interface 602, and to determine whether a setting of the controllable device 600 should be changed in response to the notifications. In some embodiments, the notification processing engine 610 is also configured to filter notifications for selective retransmission. Further description of the configuration of and actions performed by these components is provided below.

Figure 7:
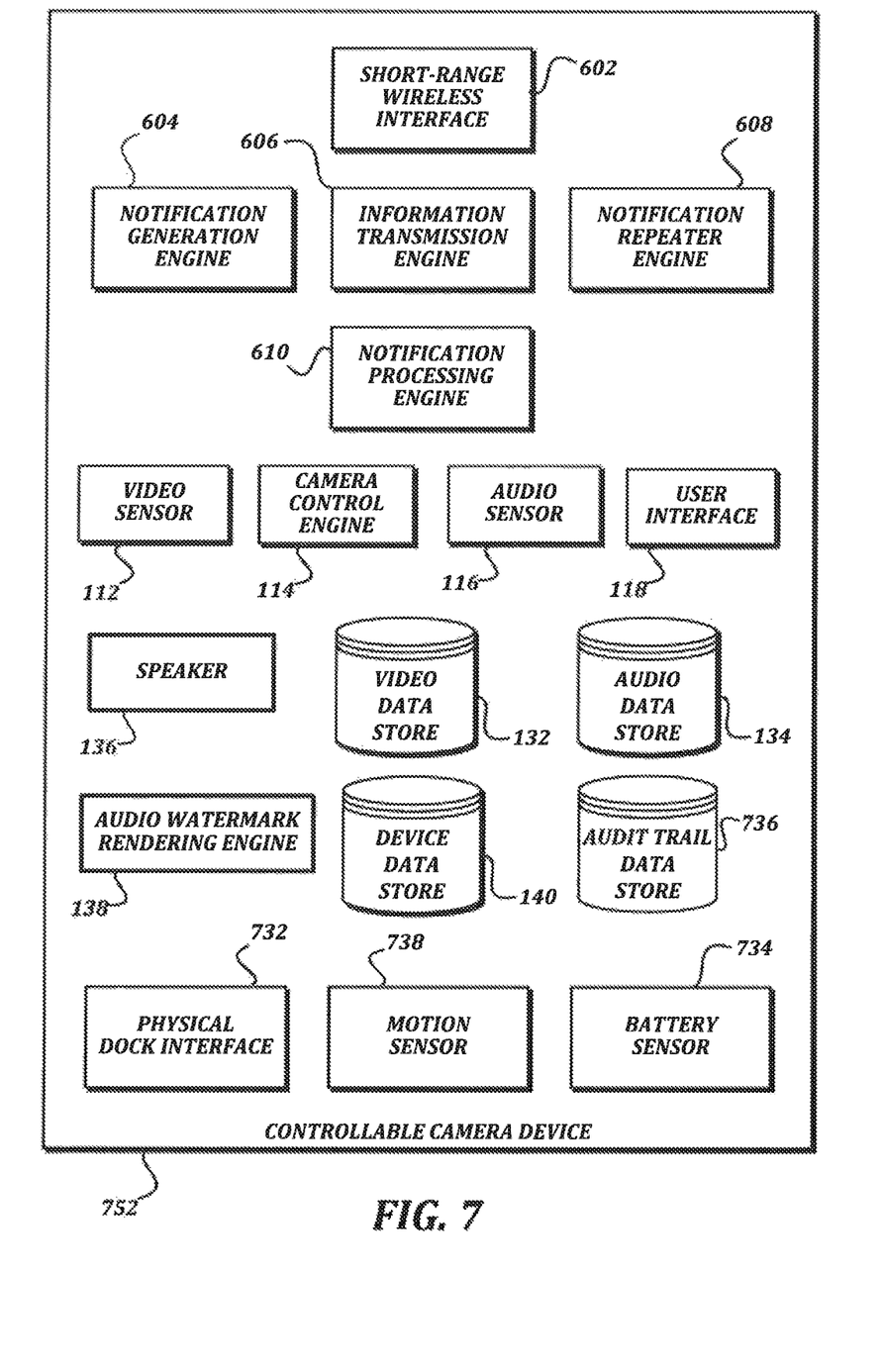
FIG. 7 is a block diagram that illustrates components of an exemplary embodiment of a controllable camera device according to various aspects of the present disclosure.

One of ordinary skill in the art will recognize that, though components common to illustrative controllable devices are illustrated in FIG. 6, some controllable devices may include additional components. For example, FIG. 7 is a block diagram that illustrates components of an exemplary embodiment of a controllable camera device according to various aspects of the present disclosure. In some embodiments, the controllable camera device 752 is a wearable camera that provides a point of view associated with the user 592. In some embodiments, the controllable camera device 752 may be attached to another device carried by the user 592, such as a weapon.

Because the controllable camera device 752 is a type of controllable device 600, it includes a short-range wireless interface 602, a notification generation engine 604, an information transmission engine 606, a notification repeater engine 608, and a notification processing engine 610 as described above. Further, in this example, the controllable camera device 752 includes components of the camera device 110 shown in FIG. 1, such as a video sensor 112, camera control engine 114, audio sensor 116, user interface 118, video data store 132, audio data store 134, and speaker 136. The speaker 136 can be used to emit audio watermarks or synchronization tones. The audio sensor 116 can be used to record audio watermarks and synchronization tones emitted by other recording devices.

As understood by one of ordinary skill in the art, a "data store" as described herein may be any suitable device configured to store data for access by a computing device. Referring again to FIG. 5, one example of a data store suitable for use with the evidence management system 502 is a highly reliable, high-speed relational database management system (RDBMS) executing on one or more computing devices and accessible over a high-speed network. However, any other suitable storage technique and/or device capable of quickly and reliably providing the stored data in response to queries may be used, such as a key-value store, an object database, and/or the like. Further, for the evidence management system 502, the computing device providing the data store may be accessible locally instead of over a network, or may be provided as a cloud-based service. A data store may also include data stored in an organized manner on a computer-readable storage medium, as described further below. Referring again to FIG. 7, one example of a data store suitable for use with the needs of the controllable camera device 752, which includes reliable storage but also low overhead, is a file system or database management system that stores data in files (or records) on a computer-readable medium such as flash memory, random access memory (RAM), hard disk drives, and/or the like.

One of ordinary skill in the art will recognize that separate data stores described herein may be combined into a single data store, and/or a single data store described herein may be separated into multiple data stores, without departing from the scope of the present disclosure.

In the example shown in FIG. 7, the camera control engine 114 may automatically start, pause, or stop video or audio recording in response to an instruction received from, for example, the notification processing engine 610 related to a notification received via the short-range wireless interface 602. In some embodiments, the camera control engine 114 may record events relating to starting, pausing, or stopping the video or audio recording, and potentially other information such as settings for the video sensor 112 and audio sensor 116, in an audit trail data store 736. In some embodiments, the camera control engine 114 may embed the sensor configuration information in the data stored in the video data store 132 and/or audio data store 134, along with other information about the state of the controllable camera device 752. The notification processing engine 610 may likewise store records of received notifications and/or information, and the notification generation engine 604 may likewise store records of generated notifications and/or information, in the audit trail data store 736, the video data store 132, and/or the audio data store 134.

The controllable camera device 752 may also include a number of other components, including a motion sensor 738, a physical dock interface 732, and a battery sensor 734. The motion sensor 738, such as a multi-axis accelerometer, produces information that may be used by other components. For example, the notification generation engine 604 may use the motion sensor 738 to detect a certain types of motion, such as running, falling, and/or the like, and to generate notifications announcing when particular types of motion are detected.

The physical dock interface 732 is configured to mate with a physical connector on the evidence collection dock 504 (see FIG. 5). The physical dock interface 732 may include a female 2.5 mm socket, which mates with a male 2.5 mm plug of the evidence collection dock 504. Once docked, the controllable camera device 752 may then transfer data to the evidence management system 502 (see FIG. 5) via the connection using any suitable data transmission protocol. In some embodiments, power may be transferred to the controllable camera device 752 via the physical dock interface 732. In some embodiments, other connection hardware that can provide both power and data connectivity may be used, such as a USB connector, a Firewire connector, and/or the like.

Figure 8:
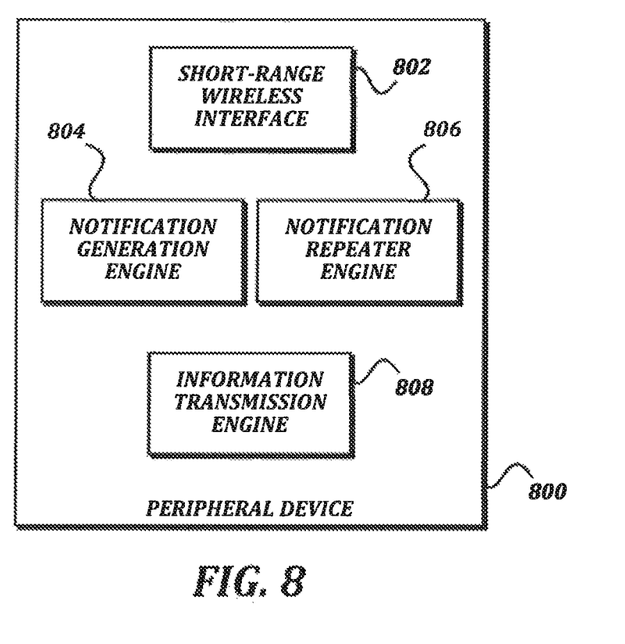
FIG. 8 is a block diagram that illustrates an exemplary embodiment of a peripheral device that may be used in a distributed control system according to various aspects of the present disclosure.

FIG. 8 is a block diagram that illustrates an exemplary embodiment of a peripheral device according to various aspects of the present disclosure. As illustrated, the peripheral device 800 includes a short-range wireless interface 802, a notification generation engine 804, a notification repeater engine 806, and an information transmission engine 808. One of ordinary skill in the art will recognize that these components are similar to the short-range wireless interface 602, notification generation engine 604, notification repeater engine 608, and information transmission engine 606 illustrated and described above with respect to the controllable device 600. As such, a detailed description of the similar components in the peripheral device 800 is not provided here for the sake of brevity. The peripheral device 800 and the controllable device 600 have some overlapping capabilities (as discussed in more detail below), and so include similar components. However, the peripheral device 800 is generally used as a source of notifications based on events detected by or generated by components of the peripheral device 800, and is not generally controllable based on received notifications. Accordingly, the peripheral device 800 is missing the notification processing engine 610 that is present in the controllable device 600. This allows for the simplification of the hardware used in a peripheral device 800, thus reducing cost and improving battery life.

As will be recognized by one of ordinary skill in the art, many other types of peripheral devices 800 and controllable devices 600 not illustrated in the drawings may be used. These devices will include the common features of the peripheral device 800 and/or the controllable device 600, and may include additional sensors appropriate for detecting relevant statuses of the components of the particular device.

As an example, in some embodiments, a personal assistant device may be configured as a peripheral device. A personal assistant device, such as the personal assistant device 507 illustrated in FIG. 5, may include any personal computer system that performs user-selected programs and supports communication with other officers (e.g., officers not co-located with the officer, officers operating dispatch or inventory functions, and/or the like) and/or communicates with other members of the system (e.g., forwards notices, batches notices to forward, derives a new notice from one or more other notices). For example, a personal assistant may be packaged as or with the functions of a laptop computing device, a wrist-worn computing device, a tablet computing device, a body-worn computing device, a smartphone, and/or the like. Communication may include any conventional technologies (e.g., cellular phone service, text and data messaging, email, voice over IP, push-to-talk, video over cellular, video over IP, and/or the like). Communication may use conventional public or private media (e.g., public cellular phone service, local area service, reserved channels, private trunk service, emergency services radio bands, and/or the like). In some embodiments, the personal assistant device may be configured as a controllable device, as opposed to a peripheral device.

In some embodiments, vehicle environment monitors may be provided as peripheral devices or controllable devices. A vehicle environment monitor may include enhanced monitoring and/or recording sensors that expands an unaided user's awareness (e.g., night vision cameras, ultrasound detecting microphones, gunshot detection/location sensor, and/or the like). Some vehicle environment monitors may provide the capability of recording audio watermarks and synchronization tones. Some vehicle environment monitors may also provide analyzed data that goes beyond mere recording. Analysis may include recognition, correlation, and/or prediction based on information monitored or recorded from any source, such as other sensors within the system 500. Analysis of video or still photographs may be used for recognition of car make and model and identification of the owner of the vehicle and owner of the vehicle license. Analysis of audio and video may be used for recognition of audio watermarks and synchronization tones and the devices associated with them, recognition and identification of voices, faces, body dimensions, birth marks, tattoos, clothing, currency, drivers' licenses, and/or documents. Predictions may include conventional algorithms for the prediction of crime, for example, predictions based on locations of persons, locations of vehicles, recent dispatches, and recent sniffed, snooped, or analyzed network packets.

Figure 9:
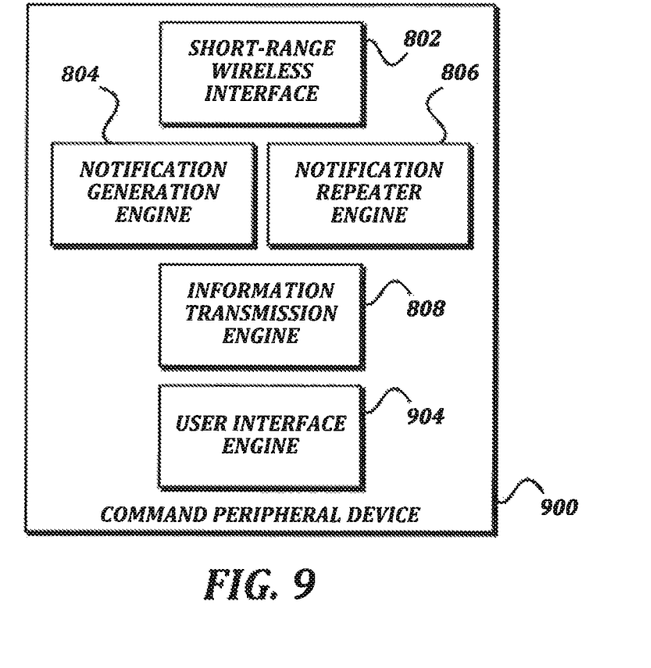
FIG. 9 is a block diagram that illustrates an exemplary embodiment of a command peripheral device that may be used in a distributed control system according to various aspects of the present disclosure.

In some embodiments, some peripheral devices may be configured to generate notifications as desired by a user, as opposed to automatically in response to data generated by a sensor. As an example, FIG. 9 is a block diagram that illustrates an exemplary embodiment of a command peripheral device 900 according to various aspects of the present disclosure. The command peripheral device 900 is a type of peripheral device 800, and so it includes a short-range wireless interface 802, a notification generation engine 804, a notification repeater engine 806, and an information transmission engine 808 as described above. The command peripheral device 900 also includes a user interface engine 904. The user interface engine 904 is configured to generate a user interface for accepting commands from a user intended for a controllable device. In this way, notifications may be generated that are not in response to a sensed status change, but are instead intentionally created by a user. When a command is received by the user interface engine 904, the notification generation engine 804 generates a notification and optionally generates information for propagation in a manner similar to other notifications.

Referring again to FIG. 5, in some embodiments the command peripheral device 900 may be an interactive device carried by the user 592 or in the vehicle 594, such as a smartphone, a tablet computing device, a laptop computing device, and/or the like. In some embodiments, the command peripheral device 900 may be a desktop computing device or a server computing device located remotely from the user 592 and operated by a dispatcher or other such user. In such embodiments, the command peripheral device 900 may include a long-range network interface, such as a wired network interface, a WiFi network interface, an LTE network interface, and/or the like. The notification in such embodiments would be sent in a targeted manner to another device with a long-range network interface, such as the personal assistant device 507, which may then propagate the notification and/or information throughout the rest of the system 500.

Figure 10:
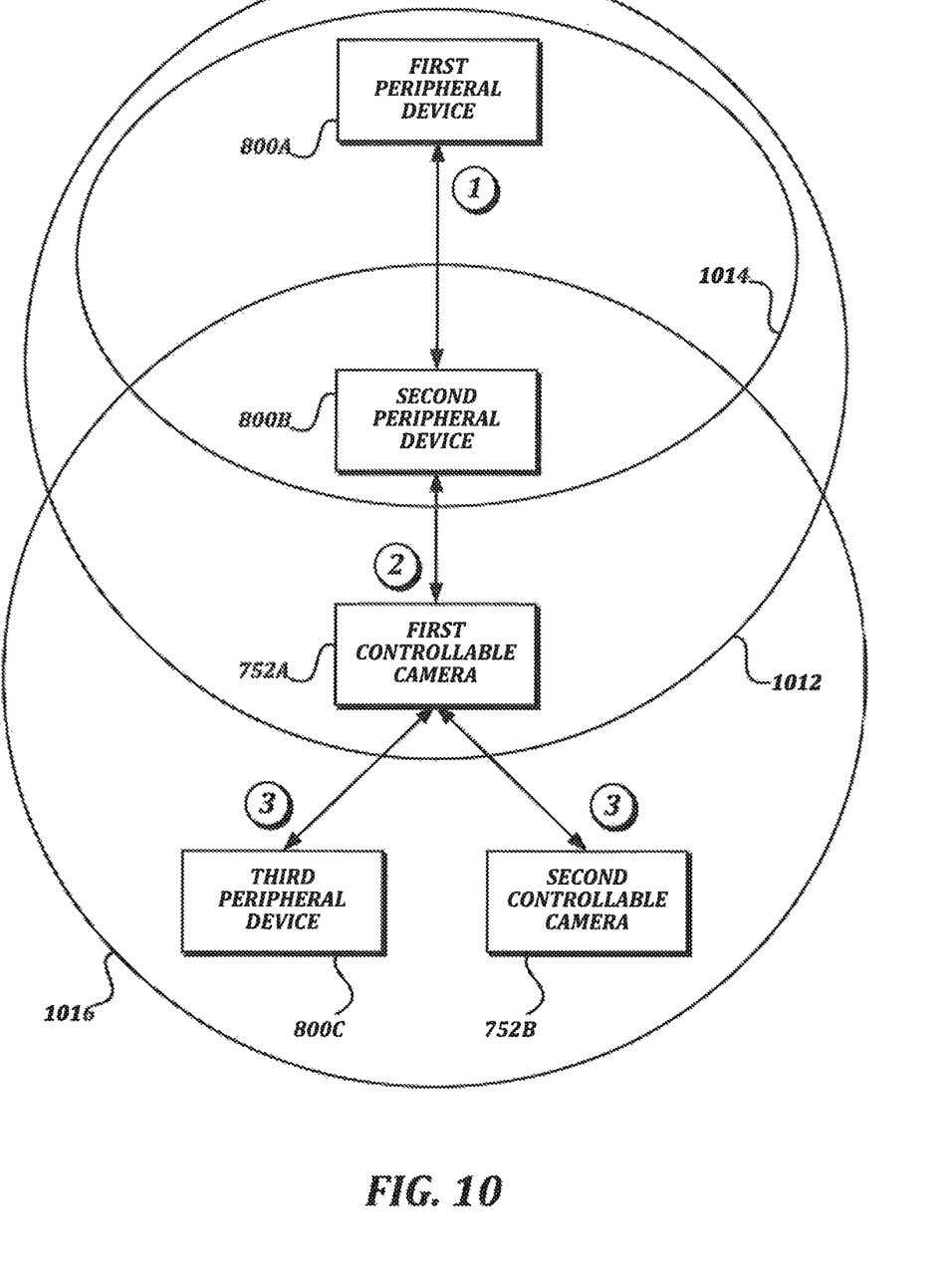
FIG. 10 is a schematic diagram of exemplary embodiments of communication between devices (including controllable camera devices) in a distributed control system according to various aspects of the present disclosure.

FIG. 10 is a high-level schematic diagram of exemplary embodiments of communication between devices (including controllable camera devices) in a distributed control system according to various aspects of the present disclosure. As explained above with reference to FIG. 7, a controllable camera device may have the ability to emit audio watermarks and synchronization tones, and record or process audio watermarks and synchronization tones emitted by other recording devices. Thus, controllable camera devices can communicate with other devices in multiple ways, e.g., with notifications within a distributed control system as illustrated in FIG. 10, and by emitting audio watermarks and synchronization tones, or recording and/or processing audio watermarks and synchronization tones emitted by other recording devices.

In the example shown in FIG. 10, a setting is changed on a first controllable camera device 752A in response to a notification generated on a first peripheral device 800A. The first peripheral device 800A detects an event that causes a notification to be generated. At a first point in a communication sequence, the first peripheral device 800A generates a notification and transmits the notification to one or more devices within a short-range wireless communication range 1014 of the first peripheral device 800A. As illustrated, a second peripheral device 800B is within the communication range 1014, but the first controllable camera device 752A is not. As discussed in further detail below, the notification may include all of the information needed to describe the event, or the second peripheral device 800B may, upon receiving the notification, request further information from the first peripheral device 800A.

At a second point in the communication sequence, the second peripheral device 800B retransmits the notification originally generated by the first peripheral device 800A to other devices within a communication range 1012 of the second peripheral device 800B. For example, the first controllable camera device 752A is within the communication range 1012 of the second peripheral device 800B. Accordingly, the first controllable camera device 752A receives the notification from the second peripheral device 800B. As discussed in further detail below, in some embodiments the notification transmitted by the second peripheral device 800B may be the same notification as that originally transmitted by the first peripheral device 800A and so appears to the first controllable camera device 752A as having been transmitted by the first peripheral device 800A. In some embodiments, the second peripheral device 800B may generate a new notification based on the notification received from the first peripheral device 800A, and transmit that new notification to the first controllable camera device 752A. As above, all of the information needed by the first controllable camera device 752A to change its setting may be included in the notification, or the first controllable camera device 752A may request further information from the second peripheral device 800B upon receiving the notification. In the second case, the second peripheral device 800B may respond to the request for further information with the information it retrieved from the first peripheral device 800A. The first controllable camera device 752A may then change one or more of its settings based on the notification and/or the information.

At a third point in the communication sequence, the first controllable camera device 752A may itself retransmit the notification in order to ensure the broadest possible propagation of the notification despite only using short-range wireless technology. Accordingly, the notification retransmitted by the first controllable camera device 752A may be received by other devices within a communication range 1016 of first controllable camera device 752A, such as a third peripheral device 800C and a second controllable camera device 752B. As described above, the retransmitted notification could match the original notification, or could be a new notification based on the original notification. In some embodiments, any retransmitted notification is be ignored by the original peripheral device or controllable device, even if the original device is within communication range and receives the retransmitted notification. This may help to avoid exponential growth of transmitted notifications, and may save battery life on the original device by not having to fully process as many incoming notifications.

As stated above, any suitable short-range wireless communication technology may be used for the communication. In some embodiments, if Bluetooth or Bluetooth Low Energy is used, the devices may form piconets and scatternets. For example, the communication range 1014 may represent a piconet comprising the first peripheral device 800A and the second peripheral device 800B, communication range 1012 may represent a piconet comprising the second peripheral device 800B and the first controllable camera device 752A, and communication range 1016 may represent a piconet comprising the first controllable camera device 752A, the third peripheral device 800C, and the second controllable camera device 752B. As such, communication ranges 1012, 1014, and 1016 may be joined by their common devices to form a scatternet.

Illustrative Computing Devices and Operating Environments

Figure 11:
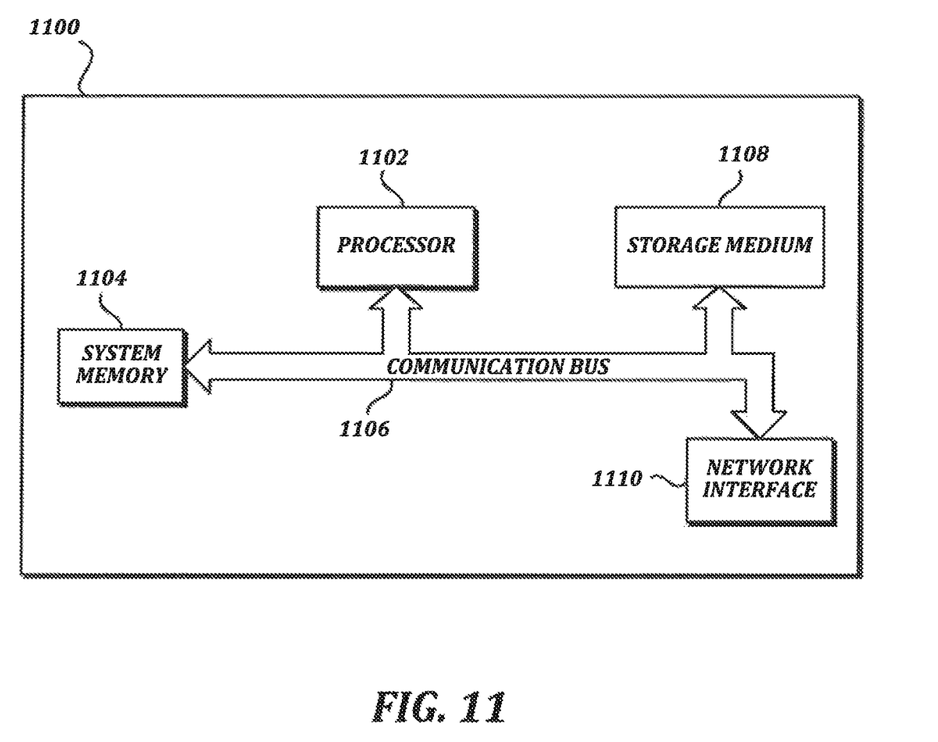
FIG. 11 is a block diagram that illustrates aspects of an exemplary computing device appropriate for use as a computing device of the present disclosure.

FIG. 11 is a block diagram that illustrates aspects of an exemplary computing device appropriate for use as a computing device of the present disclosure. While multiple different types of computing devices were discussed above, the exemplary computing device 1100 describes various elements that are common to many different types of computing devices. While FIG. 11 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 1100 may be any one of any number of currently available or yet to be developed devices.

In its most basic configuration, the computing device 1100 includes at least one processor 1102 and a system memory 1104 connected by a communication bus 1106. Depending on the exact configuration and type of device, the system memory 1104 may be volatile or nonvolatile memory, such as read only memory ("ROM"), random access memory ("RAM"), EEPROM, flash memory, or similar memory technology. Those of ordinary skill in the art and others will recognize that system memory 1104 typically stores data and/or program modules that are immediately accessible to and/or currently being operated on by the processor 1102. In this regard, the processor 1102 may serve as a computational center of the computing device 1100 by supporting the execution of instructions.

As further illustrated in FIG. 11, the computing device 1100 may include a network interface 1110 comprising one or more components for communicating with other devices over a network. Embodiments of the present disclosure may access basic services that utilize the network interface 1110 to perform communications using common network protocols. The network interface 1110 may also include a wireless network interface configured to communicate via one or more wireless communication protocols, such as WiFi, 2G, 3G, LTE, WiMAX, Bluetooth, and/or the like. As will be appreciated by one of ordinary skill in the art, the network interface 1110 illustrated in FIG. 11 may represent one or more wireless interfaces or physical communication interfaces described and illustrated above with respect to particular components of the systems described herein, e.g., system 100 (FIG. 1) or 500 (FIG. 5).

In the exemplary embodiment depicted in FIG. 11, the computing device 1100 also includes a storage medium 1108. However, services may be accessed using a computing device that does not include means for persisting data to a local storage medium. Therefore, the storage medium 1108 depicted in FIG. 11 is represented with a dashed line to indicate that the storage medium 1108 is optional. In any event, the storage medium 1108 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 1104 and storage medium 1108 depicted in FIG. 11 are merely examples of computer-readable media.

Suitable implementations of computing devices that include a processor 1102, system memory 1104, communication bus 1106, storage medium 1108, and network interface 1110 are known and commercially available. For ease of illustration and because it is not important for an understanding of the claimed subject matter, FIG. 11 does not show some of the typical components of many computing devices. In this regard, the computing device 1100 may include input devices, such as a keyboard, keypad, mouse, microphone, touch input device, touch screen, tablet, and/or the like. Such input devices may be coupled to the computing device 1100 by wired or wireless connections including RF, infrared, serial, parallel, Bluetooth, USB, or other suitable connections protocols using wireless or physical connections. Similarly, the computing device 1100 may also include output devices such as a display, speakers, or printer. Since these devices are well known in the art, they are not illustrated or described further herein.

Extensions and Alternatives

Many alternatives to the systems and devices described herein are possible. Individual modules or subsystems can be separated into additional modules or subsystems or combined into fewer modules or subsystems. Modules or subsystems can be omitted or supplemented with other modules or subsystems. Functions that are indicated as being performed by a particular device, module, or subsystem may instead be performed by one or more other devices, modules, or subsystems.

Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'including', and 'having' introduce an open-ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing".

We claim:

1. A computer system that implements a digital video and audio processing system to identify cameras that recorded video of an event, the computer system comprising one or more computing devices configured to:

receive first video data recorded at the event by a first digital video camera;

receive first audio data recorded at the event from the first digital video camera, the first audio data collected by an audio sensor of the first digital video camera and the first audio data including an audio watermark output by a speaker of the first digital video camera;

receive second video data from a second digital video camera;

receive second audio data from the second digital video camera, the second audio data collected by a second audio sensor of the second digital video camera and including the audio watermark output by the speaker of the first digital video camera; and process the audio watermark in the first audio data and the audio watermark in the second audio data to identify that the second digital video camera was present at the event.

2. The computer system of claim 1, wherein the first audio data and the second audio data further include synchronization tones output by the speaker of the first digital video camera and the one or more computing devices are further configured to use the synchronization tones to synchronize the first video data and the second video data.

3. The computer system of claim 2, wherein the one or more computing devices are further configured to use the synchronization tones to synchronize the first video data and the second video data during playback of the first video data and the second video data.

4. The computer system of claim 1, wherein the first digital video camera is one of a wearable camera and a vehicle-mounted camera.

5. The computer system of claim 4, wherein the second digital video camera is a smart phone camera.

6. The computer system of claim 1, wherein the second digital video camera is not configured to emit a second audio watermark.

7. The computer system of claim 1, wherein the first audio data includes multiple audio watermarks emitted during a single recording session, each audio watermark of the multiple audio watermarks identifying the first digital video camera.

8. The computer system of claim 1, wherein the audio watermark is a second audio watermark and the first audio data also includes a first audio watermark emitted by the speaker of the first digital video camera prior to the second audio watermark.

9. The computer system of claim 8, wherein the first audio watermark is not recorded in the second audio data received from the second digital video camera.

10. The computer system of claim 1, wherein the first video data is received via an evidence collection dock and the second video data is received from the second digital video camera via a wireless network.

11. The computer system of claim 1, wherein the audio watermark includes tones representing a first identifier of the first digital video camera, and wherein the first identifier is stored on the first digital video camera.

12. The computer system of claim 11, wherein the first identifier is a user identifier for a law enforcement officer associated with the first digital video camera.

13. The computer system of claim 1, wherein the audio watermark includes tones representing a timestamp that indicates a time that the audio watermark was emitted by the speaker of the first digital video camera.

14. The computer system of claim 1, wherein the audio watermark was output by the speaker of the first digital video camera when the first digital video camera began recording the first video data.

15. The computer system of claim 1, wherein the one or more computing devices are further configured to:
  receive third audio data from a third digital video camera, wherein the third audio data is collected by a third audio sensor of the third digital video camera and the third audio data includes both the audio watermark output by the speaker of the first digital video camera and a second audio watermark output by a second speaker of the third digital video camera; and
  process the audio watermark output by the speaker of the first digital video camera in the third audio data to identify that the third digital video camera was present at the event.

16. A computer-implemented method for identifying devices that recorded video of an event, the method performed by a digital video and audio processing system comprising one or more computing devices, the method comprising:
  receiving first video data recorded at the event by a first digital video recording device;
  receiving first audio data recorded at the event by the first digital video recording device, the first audio data including an audio watermark comprising one or more tones identifying the first digital video recording device;
  receiving second video data recorded by a second digital video recording device;
  receiving second audio data recorded by the second digital video recording device, the second audio data including the audio watermark comprising the one or more tones identifying the first digital video recording device; and
  processing the audio watermark in the first audio data and the audio watermark in the second audio data to identify that the second digital video recording device recorded the second video data at the event.

17. The method of claim 16, further comprising aligning the first video data and the second video data based on synchronization tones emitted by the first digital video recording device, wherein the synchronization tones are recorded in each of the received first audio data and the received second audio data.

18. The method of claim 16, wherein the first digital video recording device is one of a wearable camera worn by a law enforcement officer and a vehicle-mounted camera associated with the law enforcement officer.

19. The method of claim 18, wherein the audio watermark includes one or more tones representing at least one of a timestamp indicating a time that the audio watermark was emitted by the first digital video recording device and a user identifier for the law enforcement officer.

20. The method of claim 18, wherein the second digital video recording device is not configured to emit audio watermarks.

* * * * *